United States Patent
Sodagar (10) Patent No.: US 11,297,122 B2
(45) Date of Patent: Apr. 5, 2022

(54) GRAPH REPRESENTATION AND DESCRIPTION OF CONFIGURATION PARAMETERS FOR MEDIA PROCESSING FUNCTION IN NETWORK-BASED MEDIA PROCESSING (NBMP)

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/095,339

(22) Filed: Nov. 11, 2020

(65) Prior Publication Data
US 2021/0218787 A1    Jul. 15, 2021

Related U.S. Application Data

(60) Provisional application No. 62/958,997, filed on Jan. 9, 2020.

(51) Int. Cl.
| | |
|---|---|
| *H04L 29/08* | (2006.01) |
| *H04L 29/06* | (2006.01) |
| *H04L 65/60* | (2022.01) |
| *H04L 67/1042* | (2022.01) |
| *H04L 65/1089* | (2022.01) |
| *H04L 67/1008* | (2022.01) |

(52) U.S. Cl.
CPC ........ *H04L 65/601* (2013.01); *H04L 65/1089* (2013.01); *H04L 67/1008* (2013.01); *H04L 67/1044* (2013.01)

(58) Field of Classification Search
CPC .............. H04L 65/601; H04L 67/1008; H04L 67/1044; H04L 65/1089
See application file for complete search history.

(56) References Cited

U.S. PATENT DOCUMENTS

| | | | |
|---|---|---|---|
| 10,310,896 B1* | 6/2019 | Kichak | G06F 9/5027 |
| 2010/0134501 A1* | 6/2010 | Lowe | G06T 13/40 |
| | | | 345/474 |

(Continued)

OTHER PUBLICATIONS

International Search Report and Written Opinion dated Mar. 25, 2021 in International Application No. PCT/US 21/12085, 12 pgs.

(Continued)

*Primary Examiner* — Rupal Dharia
*Assistant Examiner* — Adam A Cooney
(74) *Attorney, Agent, or Firm* — Arent Fox LLP (57) ABSTRACT

A method of network-based media processing (NBMP) can include receiving a function description of a media processing function from a function repository at a workflow manager in an NBMP system. The function description can include a configuration descriptor providing configuration information of parameters for the media processing function. The parameters can have logical relationships represented by a parameter representation graph constructed according to a set of rules. The media processing function can be instantiated as a media processing task that is part of a workflow. The media processing task can be configured based on the configuration information of the parameters in the configuration descriptor.

20 Claims, 5 Drawing Sheets

(56) References Cited

U.S. PATENT DOCUMENTS

| | | | |
|---|---|---|---|
| 2013/0185715 A1* | 7/2013 | Dunning | G06F 9/45558 718/1 |
| 2014/0122706 A1* | 5/2014 | Boerner | G06F 9/5083 709/224 |
| 2016/0036693 A1* | 2/2016 | Galdy | H04L 69/164 709/219 |
| 2016/0330497 A1* | 11/2016 | VanAntwerp | H04N 21/2365 |
| 2019/0028691 A1* | 1/2019 | Hinds | H04N 21/4518 |
| 2019/0222621 A1* | 7/2019 | Kolan | G06F 9/5055 |
| 2020/0192714 A1* | 6/2020 | Clow | G06F 9/5027 |

OTHER PUBLICATIONS

Text of ISO/IEC DIS 23090-8 Network-based Media Processing, ISO/IEC ITC 1/SC 29/WG 11, N18657, Gothensburg, SE—Jul. 2019. Coding of moving pictures and audio, Covenorship: UNI (Italy), 156 pgs.

* cited by examiner

GRAPH REPRESENTATION AND DESCRIPTION OF CONFIGURATION PARAMETERS FOR MEDIA PROCESSING FUNCTION IN NETWORK-BASED MEDIA PROCESSING (NBMP)

INCORPORATION BY REFERENCE

This present disclosure claims the benefit of priority to U.S. Provisional Application No. 62/958,997, "EFFICIENT GENERIC PARAMETER GRAPH FOR FUNCTIONS" filed on Jan. 9, 2020, which is incorporated by reference herein in its entirety.

TECHNICAL FIELD

The present disclosure relates to graph representation and description of configuration parameters of a media processing function. Some embodiments are related with network-based media processing (NBMP).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multimedia service providers face the challenge of adapting their services to multiple cloud and network service providers to reach their customers. These cloud and network service providers oftentimes define their own application programing interfaces (APIs) to assign compute resources to their customers. The Network-based Media Processing (NBMP) standard is being developed to address fragmentation and offer a unified way to perform media processing on top of any cloud platform and on any IP network. NBMP defines a Workflow Manager that can use implementations of ready-made media processing functions and compose them together to create a media processing workflow.

SUMMARY

Aspects of the disclosure provide a method of network-based media processing (NBMP). The method can include receiving a function description of a media processing function from a function repository at a workflow manager in an NBMP system. The function description can include a configuration descriptor providing configuration information of parameters for the media processing function. The parameters can have logical relationships represented by a parameter representation graph constructed according to a set of rules. The rules can include:
(a) the parameter representation graph includes nodes and edges each connecting two nodes and representing a logical relationship between two respective nodes, the nodes including parameter nodes and value nodes,
(b) any two nodes are connected to each other with at most one edge,
(c) a parameter is represented by a parameter node in the parameter representation graph,
(d) if presence or absence of a parameter's value is required as a condition for setting another parameter, the parameter's value is represented by a value node in the parameter representation graph,
(e) a parameter node is connected from no other node, or one or more value nodes, and
(f) one edge is connected to any value node and from a single parameter node.

The media processing function can be instantiated as a media processing task that is part of a workflow. The media processing task can be configured based on the configuration information of the parameters in the configuration descriptor.

In an embodiment, the parameter representation graph corresponding to the configuration descriptor complies with the rules that further include:
(g) the edges in the parameter representation graph are categorized into three types defined as follows:
(i) P2V: a first connection from a parameter node to a value node indicating that the parameter of the parameter node connected to the first connection takes a subset or a range of allowed values represented by the value node connected to the first connection,
(ii) V2P: a second connection from a value node to a parameter node indicating a dependency of the parameter represented by the parameter node connected to the second connection to a parent parameter taking a value represented by the value node connected to the second connection, and
(iii) V0P: a third connection from a value node to a parameter node indicating that the parameter represented by the parameter node connected to the third connection is not allowed if a parent parameter is set to a value represented by the value node connected to the third connection; and
(h) any edge connected to a parameter node is of the type of V2P or V0P.

In an embodiment, each of the parameters has a data type indicated in the function descriptor. In an embodiment, each of the parameters has a value that is a set of values or a range of values. In an embodiment, the edges of one of the parameter nodes in the parameter representation graph are indicated by two separate lists in the function descriptor. The two separate lists correspond to the V2P type and the V0P type, respectively.

In an embodiment, identifiers (IDs) of the value nodes connected to the respective edges indicated by the two separate lists in the function descriptor are included in the two separate lists in the function descriptor to indicate the respective edges of the one of the parameter nodes. In an embodiment, one of the parameter nodes and one of the value nodes in the parameter representation graph each use a list of parent node IDs to indicate the edges connected to the one of the parameter nodes and the one of the value nodes. In an embodiment, a set of values of one of the value nodes in the parameter representation graph is defined using a start value, an end value and an increment value in the function descriptor.

Aspects of the disclosure provide an apparatus of NBMP. The apparatus can include circuitry configured to receive a function description of a media processing function from a function repository at a workflow manager in an NBMP system. The function description can include a configuration descriptor providing configuration information of parameters for the media processing function. The parameters can have logical relationships represented by a parameter representation graph constructed according to a set of rules. The rules can include:

(a) the parameter representation graph includes nodes and edges each connecting two nodes and representing a logical relationship between two respective nodes, the nodes including parameter nodes and value nodes, (b) any two nodes are connected to each other with at most one edge, (c) a parameter is represented by a parameter node in the parameter representation graph, (d) if presence or absence of a parameter's value is required as a condition for setting another parameter, the parameter's value is represented by a value node in the parameter representation graph, (e) a parameter node is connected from no other node, or one or more value nodes, and (f) one edge is connected to any value node and from a single parameter node.

The media processing function can be instantiated as a media processing task that is part of a workflow. The media processing task can be configured based on the configuration information of the parameters in the configuration descriptor.

Aspects of the disclosure further provide a non-transitory computer-readable medium storing instructions that, when executed by a processor, cause the processor to perform the method of NBMP.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Network-Based Media Processing

A network-based media processing (NBMP) framework can be employed to initialize and control media processing in a network (e.g., on a cloud platform). For example, an NBMP source describes requested media processing and provides information about the nature and format of media data. In response, an NBMP workflow manager can establish a media processing workflow and inform the NBMP source that the workflow is ready, and the requested media processing can start. The media source(s) can then start transmitting media to the network for processing.

An NBMP workflow can be understood as a connected graph of media processing tasks, each of which performs a well-defined media processing operation. The workflow manager ensures correct operation of the workflow by configuring and monitoring each task as well as a workflow output. The workflow manager is responsible for selection of media processing functions and instantiating the selected functions as tasks based on a workflow description that is received from the NBMP source.

While hiding interactions with underlying cloud computing platform from media service providers, the workflow manager can establish, load, and monitor media processing entities (MPEs) that run the media processing tasks.

Figure 1:
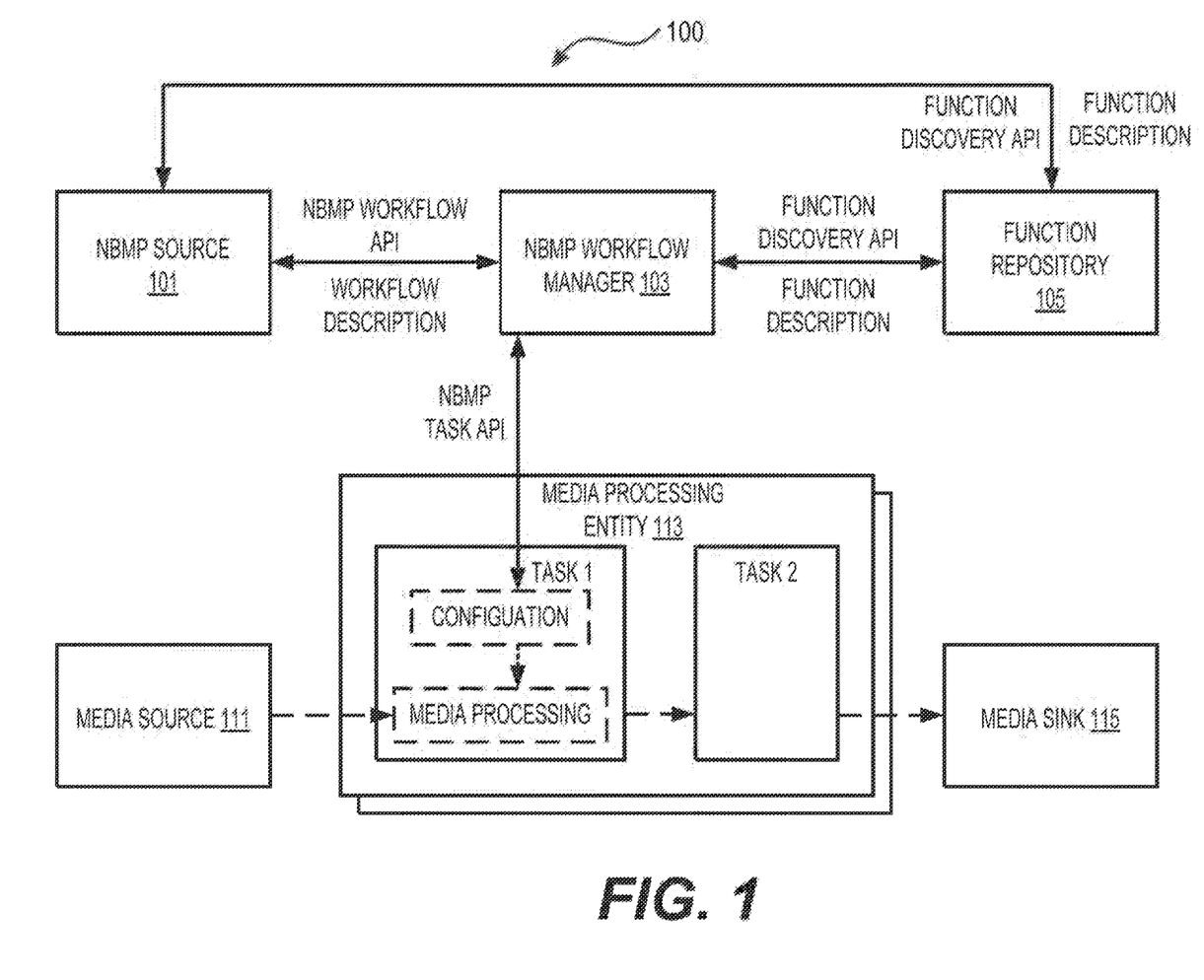
FIG. 1 shows an exemplary data processing system according to an embodiment of the disclosure.

FIG. 1 shows an exemplary NBMP system (100) according to an embodiment of the disclosure. The NBMP system (100) can support existing media delivery methods such as streaming, file delivery, push-based progressive download, hybrid delivery, multipath, and heterogeneous network environments. The NBMP system (100) can also enable emerging media applications by providing various cloud-based media processing capabilities such as network-assisted media quality enhancement (e.g., virtual reality (VR) stitching, video up-scaling, mobile edge encoding for adaptive streaming, and content-aware cloud transcoding), network-assisted media distribution (e.g., live media ingestion, online transcoding, and media-aware caching), network-assisted media composition (e.g., augmented video streaming, and customized media composition), immersive media handling (e.g., network aggregated point cloud media), and the like.

As shown, the NBMP system (100) can include an NBMP source (101), an NBMP workflow manager (103), a function repository (105), a media source (111), a data processing entity (MPE) (113), and a media sink (115). The NBMP system (100) can include additional media source(s), media sink(s), and/or MPEs.

The NBMP source (101) can describe, or otherwise indicate, media processing operations to be performed by the media processing entity (113). The function repository (105) can store various media processing functions. The NBMP source (101) and the NBMP workflow manager (103) can retrieve media processing functions from the function repository (105). A media processing function or a function can be used for performing a specific media processing process, such as a stitching process in a 360 video streaming service, an artificial intelligence (AI) based video up-scaling process in a video delivery service, or the like.

A media processing task or a task can be a runtime instance of a function that is executed by the MPE (113). An NBMP workflow or a workflow can be represented by a graph (e.g., a directed acyclic graph (DAG)) of one or more connected task(s) that achieve the requested media processing. The NBMP workflow manager (103) or the workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests as shown in FIG. 1. The APIs can include an NBMP workflow API (or a workflow API), a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

The NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., Create Workflow), updating a workflow (e.g., Update Workflow), deleting a workflow (e.g., DeleteWorkflow), retrieving a workflow (e.g., Retrieve Workflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the Tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
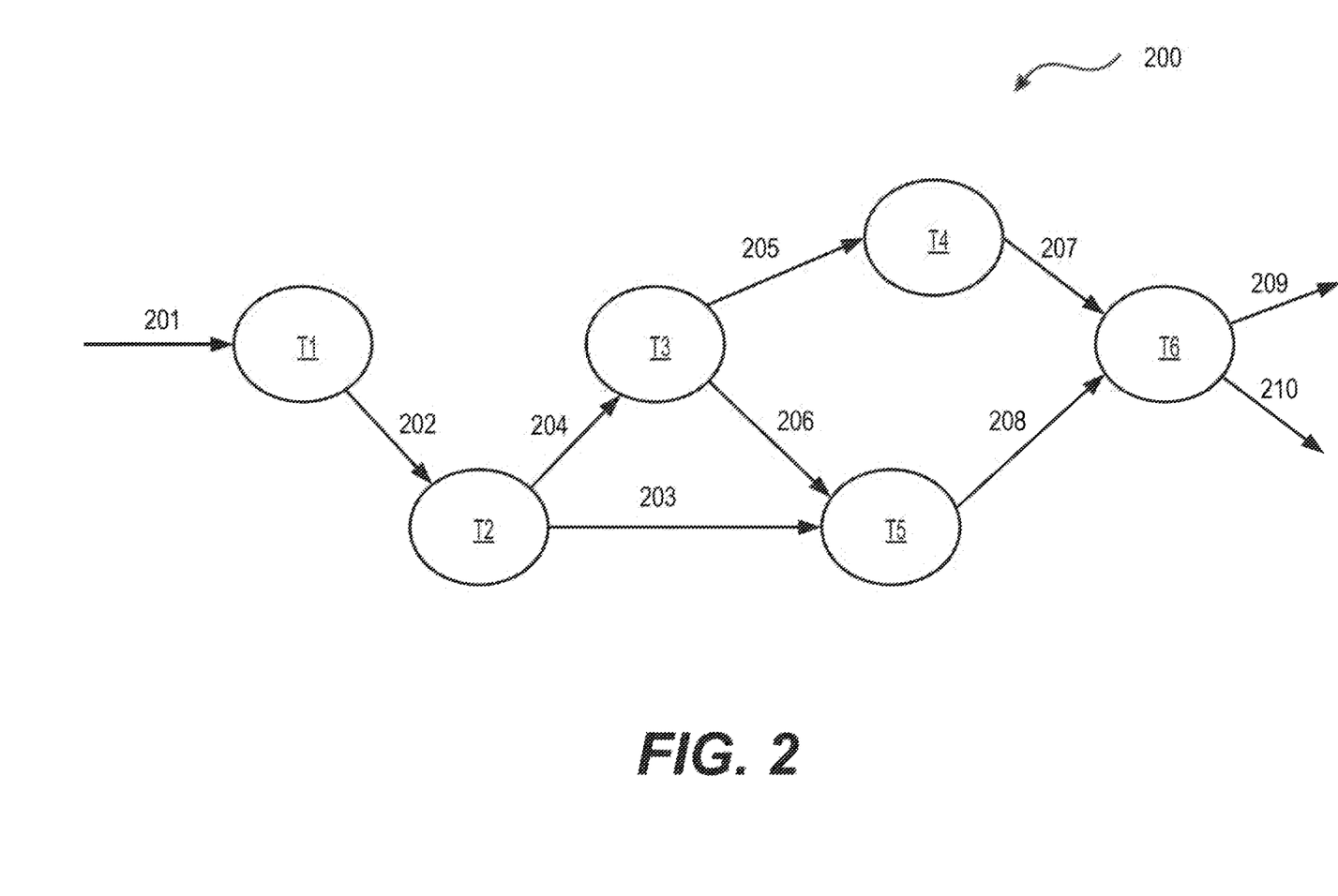
FIG. 2 shows an example of a workflow according to an embodiment of the disclosure.

The workflow manager (103) can generate a workflow, for example, as represented by a graph (e.g., a DAG). FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

II. NBMP Descriptions, Data Objects and REST Resources

To describe NBMP, in some example, parameters, descriptors, and descriptions can be defined. For example, a workflow description, a task description, and a function description can be defined to describe a workflow, a task, and a function, respectively. Each of the workflow description, the task description, and the function description can be described using a set of descriptors. Each descriptor can provide a set of parameters to describe a set of characteristics of the respective function, task, or function.

There is a one-to-one relationship between a logical description and the corresponding data object and between data document and REST resource in some examples. For example, a workflow object (WO), task object (TO) and function object (FO) are realization of the corresponding descriptions (or descriptors), for example, as javascript object notation (JSON) objects. A workflow description document (WDD), task description document (TDD), and function description document (FDD) are documents containing single WO, single TO and single FO, respectively. These documents can be JSON objects. A workflow resource (WR), task resource (TR) and function resource (FR) are WDD, TDD, and FDD with valid URLs, respectively, and therefore REST resources.

II.1 NBMP Function Description and Configuration Descriptor

In an embodiment, a media processing function in the function repository (105) can be described using a set of descriptors that form a function description. As an example, Table 1 below shows a set of descriptors of a media processing function.

TABLE 1

| Descriptor | Additional constraints | Cardinality |
| --- | --- | --- |
| Scheme | None | 0-1 |
| General | Following parameters shall not be present: priority. The parameter id shall be a valid URI according to ETF RFC 3986. | 1 |
| Input | Following parameters shall not be present: stream-id. | 1 |
| Output | Following parameters shall not be present: stream-id. | 1 |
| Processing | If the Function is a Function Group, this descriptor shall contain a connection-map object. Following parameters shall not be present: start-time. | 0-1 |
| Requirements | In Function Description, only maximum or minimum values should be specified. | 0-1 |
| Configuration | None | 0-1 |
| Client-Assistance | Following parameters shall not be present: Measurement-collection-list; Source-assistance-information. | 0-1 |
| Assertion | None | 0-1 |
| Variables | None | 0-1 |
| Events | None | 0-1 |
| Security | None | 0-1 |

Each descriptor of the media processing function can provide a group of parameters which describe a set of related characteristics of the respective media processing function. For example, the general descriptor in Table 1 can provide general details about the respective function. Table 2 shows a group of parameters corresponding to the general descriptor in Table 1.

TABLE 2

| Parameter Name | Type | Cardinality |
| --- | --- | --- |
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| execution-time | P | 0-1 |
| input-ports | Array of object | 1 |
| output-ports | Array of object | 1 |

TABLE 2-continued

| Parameter Name | Type | Cardinality |
| --- | --- | --- |
| is-group | P | 0-1 |
| state | P | 1 |

The configuration descriptor in Table 1 can provide configuration information for the respective media processing function. As an example, Table 3 shows parameters corresponding to the function descriptor in Table 1.

TABLE 3

| Parameter Name | Description | Data Type | Cardinality |
| --- | --- | --- | --- |
| parameters | Configuration details of parameters required for resource. | Array of object | 1 |

As an example, Table 4 shows a JSON schema for creating a JSON object of the configuration descriptor.

TABLE 4

```
{
"title": "Configuration Descriptor Schema",
"type": "object",
"required": [ "parameters" ],
"properties": {
"parameters": {
  "type": "array",
  "uniqueItems": true,
  "items": {
    "type": "object",
    "required": [
      "name", "id", "type"
    ],
    "properties": {
      "name": {
        "type": "string"
      },
      "Id": {
        "type": "integer"
      },
      "type": {
        "type": "string",
        "enum": [
          "simple", "enum", "range", "class"
        ]
      },
      "datatype": {
        "type": "string",
        "enum": [
          "boolean", "integer", "unsigned-integer", "float", "string", "object", "other"
        ]
      },
      "default": {
        "type": "object"
      },
      "restrictions": {
        "type": "object",
        "properties": {
          "enum-values": {
            "type": "array",
            "uniqueItems": true,
            "items": {
              "type": "string"
            }
          },
          "int-range": {
            "type": "object",
            "properties": {
              "min-value": {
                "type": "integer"
              },
```

TABLE 4-continued

```
              "max-value": {
                "type": "integer"
              },
              "increment": {
                "type": "integer"
              }
            }
          },
          "float-range": {
            "type": "object",
            "properties": {
              "min-value": {
                "type": "number"
              },
              "max-value": {
                "type": "number"
              },
              "increment": {
                "type": "number"
              }
            }
          }
        }
      },
      "conditions": {
        "type": "array",
        "uniqueItems": true,
        "description": "List of configurarion ids",
        "items": {
          "type": "integer"
        }
      },
      "exclusion": {
        "type": "array",
        "description": "List of configurarion ids",
        "uniqueItems": true,
        "items": {
          "type": "integer"
        }
      }
    }
  }
}
}
}
```

III. Graph Representation and Data Object of Configuration Parameters of a Media Processing Function III.1 Parameter Graph In some examples, a parameter set for configuring a media processing function can be represented as a parameter graph (or referred to as a parameter representation graph). The parameter set can include parameters in a descriptor of a function description of the media processing function. Logical relationships (e.g., dependencies or exclusions) among the parameters can be described using the parameter graph.

Aspects of the disclosure describe rules for constructing the parameter graph. Compared with prior art, the parameter graph can be constructed in a simplified way by using the construction rules described herein. A data object (e.g., JSON object) of the configuration descriptor generated based on the parameter graph can also be simplified and have a more compact format. Parsing operations over such a data object can also be simplified. The rules can be used for constructing a parameter graph for configuration parameters of a configuration descriptor in a function description in NBMP, or used for constructing parameter graphs for any other configuration parameters of a function not related with NBMP.

As an example, a set of rules for constructing a parameter graph can be described as follows.

A parameter graph can include nodes and edges. An edge is a connection between two nodes and represents a logical relationship between the two nodes. Any two nodes must be connected to each other with at most one edge.

There can be two types of nodes: parameter nodes and value nodes. A parameter must be represented by a parameter node in the parameter graph. If a presence of a value, a subset or a subrange of a parameter's value (in a dependency relationship) or an absence of the parameter's value (in an exclusion relationship) is required as a condition for setting another parameter, that value or subset or subrange must be represented by a value node in the parameter graph.

There can be three types of edges defined in the parameter graph:

P2V: connection from a parameter node to a value node indicating that the parameter of the parameter node may take a subset or subrange of its allowed values represented by the value node.

V2P: connection from a value node to a parameter node indicating a dependency of the parameter represented by the parameter node to the parent parameter taking those specific values represented by the value node.

V0P: connection from a value node to a parameter node indicating that the parameter represented by the parameter node is not allowed (e.g., not used) if the parent parameter is set to the value represented by the value node.

A parameter node may be connected from no other node, or one or more value nodes. Exactly one edge must be connected to any value node, and that edge must be from a single parameter node. Any edge connected to a parameter node must be one of the V2P or V0P type.

A parameter graph constructed by using the above rules can be represented by a data object, such as a JSON object. The logical relationships among the parameters in the constructed parameter graph can be described by this data object.

Figure 3:
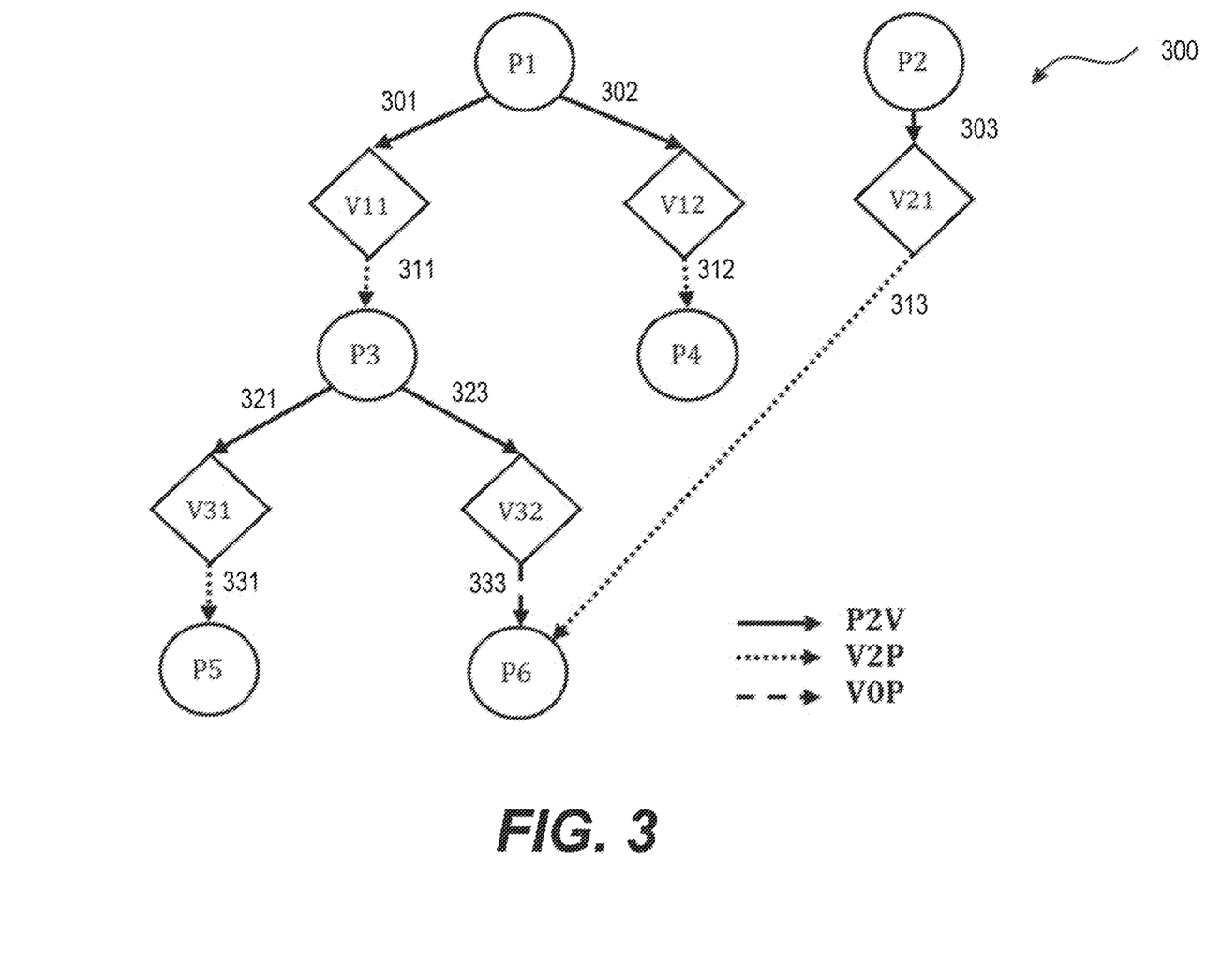
FIG. 3 shows an example parameter representation graph according to an embodiment of the disclosure.

FIG. 3 shows an example of a parameter graph (300) complying with the rules described above. In the parameter graph (300), circular nodes represent parameter nodes P1-P6 corresponding to parameters P1-P6. Square nodes represent value nodes V11, V12, V21, V31, and V32 corresponding to values (e.g., a value, a subset of allowable values, a subrange of allowable values). Edges (301), (302), (303), (311), (312), (313), (321), (323), (331), and (323) connect the parameter nodes and the value nodes as shown in FIG. 3. Three types of edges, P2V, V2P, and V0P, are represented by a solid line arrow, a dotted line arrow, and a dashed line arrow, respectively. In addition, parameter node P1 is a parent node of parameter node P3 or P4. Parameter node P3 is a parent node of parameter node P5 or P6.

As shown, the parameter graph (300) can have a hierarchical structure including 5 levels. For example, the first level can include nodes P1 and P2. The second level can include nodes V11, V12, and V21. The third level can include nodes P3 and P4. The fourth level can include nodes V31, and V32. The last level can include nodes P5 and P6.

Parameter node P1 has two value nodes V11 and V12 connected by P2V edges (301) and (302). If parameter P1 is set to values indicated by V11, the P3 parameter can be set as indicated by the V2P edge (311), and the parameter P4 is not allowed. If parameter P1 is set to values indicated by V12, parameter P4 can be set as indicated by the V2P edge (312), and the parameter P3 is not used.

If parameter P3 is set to values represented by V31 as indicated by the P2V edge (321), then parameter P5 can be set as indicated by the V2P edge (331). If parameter P3 is not set to values represented by V32 (e.g., can be set to values represented by V31 or any other valid value outside of V32) and if P2 is set to values represented by V21, then P6 can be set, which is indicated by the V0P edge (333) and the V2P edge (313). If parameter P3 is set to values represented by V32 or if P2 is not set to values represented by V21, then P6 is not allowed, which is also indicated by the V0P edge (333) and the V2P edge (313). The values indicated by V21 may not be the only values parameter P2 may be set to.

In some examples, the parameter graph representation can be used by a task of a workflow to select or verify a subset of configuration parameters of a respective media processing function instantiated as the task.

In an example, the workflow manager (103) can query the function repository (105) to receive a function description of a media processing function. The function description can include a configuration descriptor describing a set of configuration parameters of the media processing function. The workflow manager (103) can instantiate the media processing function as a task. The workflow manager (103) can further configure the task by passing the configuration descriptor to the task. By parsing the configuration descriptor (e.g., a JSON object), the task can accordingly construct a parameter graph. When in running state, the task can select and verify a subset of the configuration parameters based on initial parameter values provided by the media source (111) in an example.

An example process of selection and verification of a subset of configuration parameters based on a parameter graph is described as follows. The process can include the following steps:

1) Set i to value 1, representing level 1 of the parameter graph.
2) For parameters of level i, select a subset Si of these parameters to be included in the configuration.
3) For each selected parameter Pi:j, determine the set of values Vi:k that can be assigned to Pi:j (allowable values).
4) Assign appropriate Value for Pi:j out of the possible values Vi:k.
5) Based on assigned values for each parameter Pi:j, determine subset Si+1 of parameters Pi+1:m with edges of type 2 (dependency relationship) and exclude parameters with edges of type 3 from the graph(exclusion relationship).
6) Set i=i+1 and if the new subset Si is not empty, go to step 2.
7) If Si is empty, verify that the graph has no nodes of type 3 (exclusion) and return the created configuration.

III.2 Data Object Format

A data object, such as a JSON object, can be created for a configuration descriptor in a function description based on a parameter representation graph of configuration parameters described by the configuration descriptor. For example, a JSON scheme can be specified to reflect parameter logical relationships described using parameter graph compliant to the rules described in Section III.1. A JSON object of a configuration descriptor can be created according to the specified JSON scheme to reflect parameter logical relationships of configuration parameters described by the configuration descriptor. The JSON scheme shown in Table 4 is an example that is specified based on a parameter graph compliant to the rules described in Section III.1.

Table 5 shows another example JSON scheme that is specified based on a parameter graph compliant to the rules described in Section III.1

TABLE 5

| Row # | JSON Scheme for JSON Object of Configuration Descriptor |
| --- | --- |
| 1 | "parameters": { |
| 2 |   "type": "array", |
| 3 |   "items": { |
| 4 |     "type": "object", |
| 5 |     "required": [ |
| 6 |       "name", "id", "type" |
| 7 |     ], |
| 8 |     "properties": { |
| 9 |       "name": { |
| 10 |         "type": "string" |
| 11 |       }, |
| 12 |       "id": { |
| 13 |         "type": "integer" |
| 14 |       }, |
| 15 |       "type": { |
| 16 |         "type": "string", |
| 17 |         "enum": [ |
| 18 |           "simple", "enum", "range", "class" |
| 19 |         ] |
| 20 |       }, |
| 21 |       "datatype": { |
| 22 |         "type": "string", |
| 23 |         "enum": [ |
| 24 |           "boolean", "interger", "unsigned- |
| 25 | integer", "float", "string", "object", "other" |
| 26 |         ] |
| 27 |       }, |
| 28 |       "default": { |
| 29 |         "type": "object" |
| 30 |       }, |
| 31 |       "restrictions": { |
| 32 |         "type": "object", |
| 33 |         "properties": { |
| 34 |           "enum-values": { |
| 35 |             "type": "array" |
| 36 |           }, |
| 37 |           "int-range": { |
| 38 |             "type": "object", |
| 39 |             "properties": { |
| 40 |               "min-value": { |
| 41 |                 "type": "integer" |
| 42 |               }, |
| 43 |               "max-value": { |
| 44 |                 "type": "integer" |
| 45 |               }, |
| 46 |               "increment": { |
| 47 |                 "type": "integer" |
| 48 |               } |
| 49 |             } |
| 50 |           }, |
| 51 |           "float-range": { |
| 52 |             "type": "object", |
| 53 |             "properties": { |
| 54 |               "min-value": { |
| 55 |                 "type": "float" |
| 56 |               }, |
| 57 |               "max-value": { |
| 58 |                 "type": "float" |
| 59 |               }, |
| 60 |               "increment": { |
| 61 |                 "type": "float" |
| 62 |               } |
| 63 |             } |
| 64 |           } |
| 65 |         } |
| 66 |       }, |
| 67 |       "conditions": { |
| 68 |         "type": "array", |
| 69 |         "items": "integer" |
| 70 |       }, |
| 71 |       "exclusion": { |
| 72 |         "type": "array", |
| 73 |         "items": "integer" |
| 74 |       } |
| 75 |     } |
| 76 |   } |
| 77 | } |

Table 6 shows an example JSON object created according to the JSON scheme in Table 5. The JSON object in Table 6 corresponds to the parameter graph (300) in FIG. 3. Creation of the JSON object in Table 6 is based on the parameter logical relationships indicated by the parameter graph (300).

TABLE 6

| Row # | JSON Object |
| --- | --- |
| 1 | "parameters": [ |
| 2 |   {"name": "p1", "id": "1", "type": "simple", "datatype": "unsigned- |
| 3 | integer"}, |
| 4 |   {"name": "p2", "id": "2", "type": "simple", "datatype": "integer"}, |
| 5 |   {"name": "v11", "id": "11", "type": "range", |
| 6 |     "restrictions": { |
| 7 |       "int-range": {"min-value": "0", "max-value": "10"} |
| 8 |     }, |
| 9 |     "conditions": ["1"] |
| 10 |   }, |
| 11 |   {"name": "v12", "id": "12", "type": "range", |
| 12 |     "restrictions": { |
| 13 |       "int-range": {"min-value": "11"} |
| 14 |     }, |
| 15 |     "conditions": ["1"] |
| 16 |   }, |
| 17 |   {"name": "v21", "id": "21", "type": "range", |
| 18 |     "restrictions": { |
| 19 |       "int-range": {"min-value": "0"} |
| 20 |     }, |
| 21 |     "conditions": ["2"] |
| 22 |   }, |
| 23 |   {"name": "p3", "id": "3", "type": "enum", |
| 24 |     "restrictions": { |
| 25 |       "enum-values": ["linear", "exponential"] |
| 26 |     }, |
| 27 |     "conditions": ["11"] |
| 28 |   }, |
| 29 |   {"name": "p4", "id": "4", "type": "simple", "datatype": "float", |
| 30 |     "conditions": ["12"] |
| 31 |   }, |
| 32 |   {"name": "v31", "id": "31", "type": "enum", |
| 33 |     "restrictions": { |
| 34 |       "enum-values": ["linear"] |
| 35 |     }, |
| 36 |     "conditions": ["3"] |
| 37 |   }, |
| 38 |   {"name": "v32", "id": "32", "type": "enum", |
| 39 |     "restrictions": { |
| 40 |       "enum-values": ["exponential"] |
| 41 |     }, |
| 42 |     "conditions": ["3"] |
| 43 |   }, |
| 44 |   {"name": "p5", "id": "5", "type": "simple", "datatype": "float", |
| 45 |     "conditions": ["v31"] |
| 46 |   }, |
| 47 |   {"name": "p6", "id": "6", "type": "simple", "datatype": "double", |
| 48 |     "conditions": ["32"], |
| 49 |     "exclusion": ["21"] |
| 50 |   }, |
| 51 | ] |

According to the disclosure, because the introduction of the rules for constructing parameter graphs as describe in Section III.1, a parameter graph of a configuration descriptor can be constructed in a simplified way. A JSON object based on the parameter graph can be more compact. Parsing of such a JSON object and, accordingly, reconstruction of a parameter graph become easier.

In addition, a datatype can be assigned to each object of parameter nodes in a JSON object. In this way, a receiver of the JSON object can use right datatypes for various parameters correctly. For example, rows 21-27 in Table 5 specify the datatype parameter. Rows 2, 4, 29, 44, and 47 in Table 6 describe a datatype, respectively.

Further, as shown in Table 5 and Table 6, V2P and V02 edges can be signaled using two separate lists for each parameter node, which can simplify the JSON representation significantly. For example, the JSON scheme in Table 5 specifies a conditions object at rows 67-70, and an exclusion object at rows 71-74. The conditions object can provide a list of parameter nodes (e.g., each connected by a V2P edge) which a parameter node depends on. The exclusion object can provide a list of parameter nodes (e.g., each connected by a V0P edge) with each of which a parameter node has an exclusion relationship.

Accordingly, in Table 6, rows 48 and 49 together provide an example where a first list (including value node ID 32) of a conditions object is provided to indicate the V2P edge (333), while a second list (including value node ID 21) of an exclusion object is provided to indicate the V0P edge (313). Using the node IDs, instead of complex array of objects (as in prior art), to represent value nodes can simplify the JSON representation significantly.

Furthermore, the same edge signaling is used for bother parameter nodes and value nodes, which simplify the JSON object. As shown in Table 6, both the parameter nodes and the value nodes use the conditions object to indicate a list of parameter or value nodes which a current node is related with.

Finally, a compact format of 3 values (a start value, an end value, and an increment) is used to represent values of a value node. The 3 values can be either integer values or floating point values. As shown in rows 37-64 in Table 5, objects of min-value, max-value, and increment are specified for representing an int-range or a float-range object.

IV. Example Media Processing Processes

Figure 4:
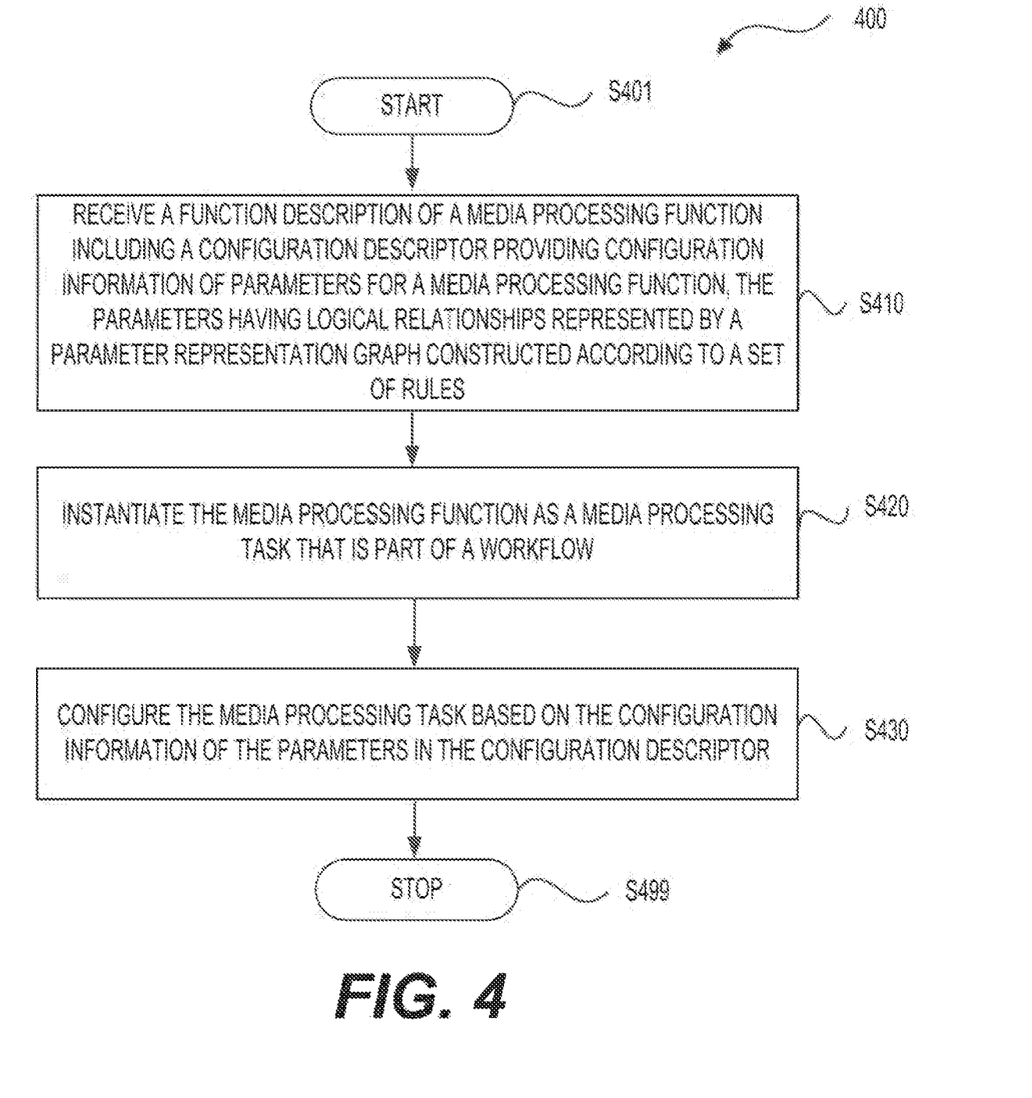
FIG. 4 shows an example network-based media processing (NBMP) process according to an embodiment of the disclosure.

FIG. 4 shows an example NBMP process (400) according to an embodiment of the disclosure. In the process, a configuration descriptor in a function description employs configuration parameter graph representation techniques described herein. In one example, the process 400 can be performed by the NBMP workflow manager (103) in the FIG. 1 example. The process (400) can start from (S401), and proceed to (S410).

At (S410), a function description of a media processing function can be received from a function repository at a workflow manager in an NBMP system. For example, the workflow manager may receive a workflow description from an NBMP source. The workflow description may indicate the media processing function used for a media processing workflow. In such a scenario, the workflow manager may obtain the function description corresponding to the indicated media processing function from the function repository.

Alternatively, the workflow description may not specify the media processing function but provides one or more keywords. In this scenario, the workflow manager can query the function repository using the keywords to obtain function descriptions of a set of functions. The workflow manager may select one or more media processing functions from the set of functions to design a workflow. A media processing function selected this way can include the function description received at (S410).

The function description received at (S410) can include a configuration descriptor providing configuration information of configuration parameters for the respective media processing function. The configuration descriptor can be a JSON object created according to a parameter representation graph. The parameters of the configuration descriptor in the JSON object can have logical relationships represented by the parameter representation graph.

Particularly, the parameter representation graph can be constructed according to a set of rules as described in Section III.1. For example, the rules for constructing the parameter representation graph can include:

(a) the parameter representation graph includes nodes and edges each connecting two nodes and representing a logical relationship between two respective nodes, the nodes including parameter nodes and value nodes;
(b) any two nodes are connected to each other with at most one edge;
(c) a parameter is represented by a parameter node in the parameter representation graph;
(d) if presence or absence of a parameter's value is required as a condition for setting another parameter, the parameter's value is represented by a value node in the parameter representation graph;
(e) a parameter node is connected from no other node, or one or more value nodes; and
(f) one edge is connected to any value node and from a single parameter node.

In one example, the rules can further include:

(g) the edges in the parameter representation graph are categorized into three types defined as follows:
  (i) P2V: a first connection from a parameter node to a value node indicating that the parameter of the parameter node connected to the first connection takes a subset or a range of allowed values represented by the value node connected to the first connection,
  (ii) V2P: a second connection from a value node to a parameter node indicating a dependency of the parameter represented by the parameter node connected to the second connection to a parent parameter taking a value represented by the value node connected to the second connection, and
  (iii) V0P: a third connection from a value node to a parameter node indicating that the parameter represented by the parameter node connected to the third connection is not allowed if a parent parameter is set to a value represented by the value node connected to the third connection; and
(h) any edge connected to a parameter node is of the type of V2P or V0P.

At (S420), the media processing function can be instantiated as a media processing task that is part of a workflow and runs in a media processing entity. For example, the workflow can be described by the workflow description received from the NBMP source or can be designed by the workflow manager. The workflow manage man communicate with a resource manager of a cloud computing platform to provision one or more media processing entities, and load a set of functions of the workflow to the media processing entities. During this process, the media processing function can be instantiated as the media processing task as part of the workflow.

At (S430), the media processing task can be configured based on the configuration information of the parameters in the configuration descriptor. For example, after the tasks start to run in the media processing entities, the workflow manager may configure the tasks so that the tasks can connect with each other according to a connection map in the respective workflow description. For example, configurations by the workflow manager can include providing information of input-ports and output-ports of each task described in the respective workflow description to each task so that media data can be passed through those tasks properly. The configurations by the workflow manager can also include passing the function descriptor (e.g., the JSON object) received at (S410) to the respective task so that the task can determine and verify a subset of the parameters based on the JSON object.

For example, the task can first reconstruct a parameter graph based on the JSON object passed to it. Then, based on the parameter graph, the task can perform the process of selection and verification described in Section III.1 to determine the subset of the parameters of the configuration descriptor received at (S410).

After the tasks are configured and the workflow is instantiated, media data can start to be received from a media source and processed using the workflow. The process (400) can proceed to (S499) and terminate at (S499).

V. Computer System

The methods, embodiments, entities, or functions disclosed herein may be implemented by processing circuitry (e.g., one or more processors or one or more integrated circuits). In one example, the one or more processors execute a program that is stored in a non-transitory computer-readable medium to perform the methods, embodiments, or functions disclosed herein. The program can be coded using any suitable machine code or computer language, that may be subject to assembly, compilation, linking, or like mechanisms to create code comprising instructions that can be executed directly, or through interpretation, micro-code execution, and the like, by one or more CPUs, GPUs, and the like. The instructions can be executed on various types of computers or components thereof, including, for example, personal computers, tablet computers, servers, smartphones, gaming devices, internet of things devices, and the like.

Figure 5:
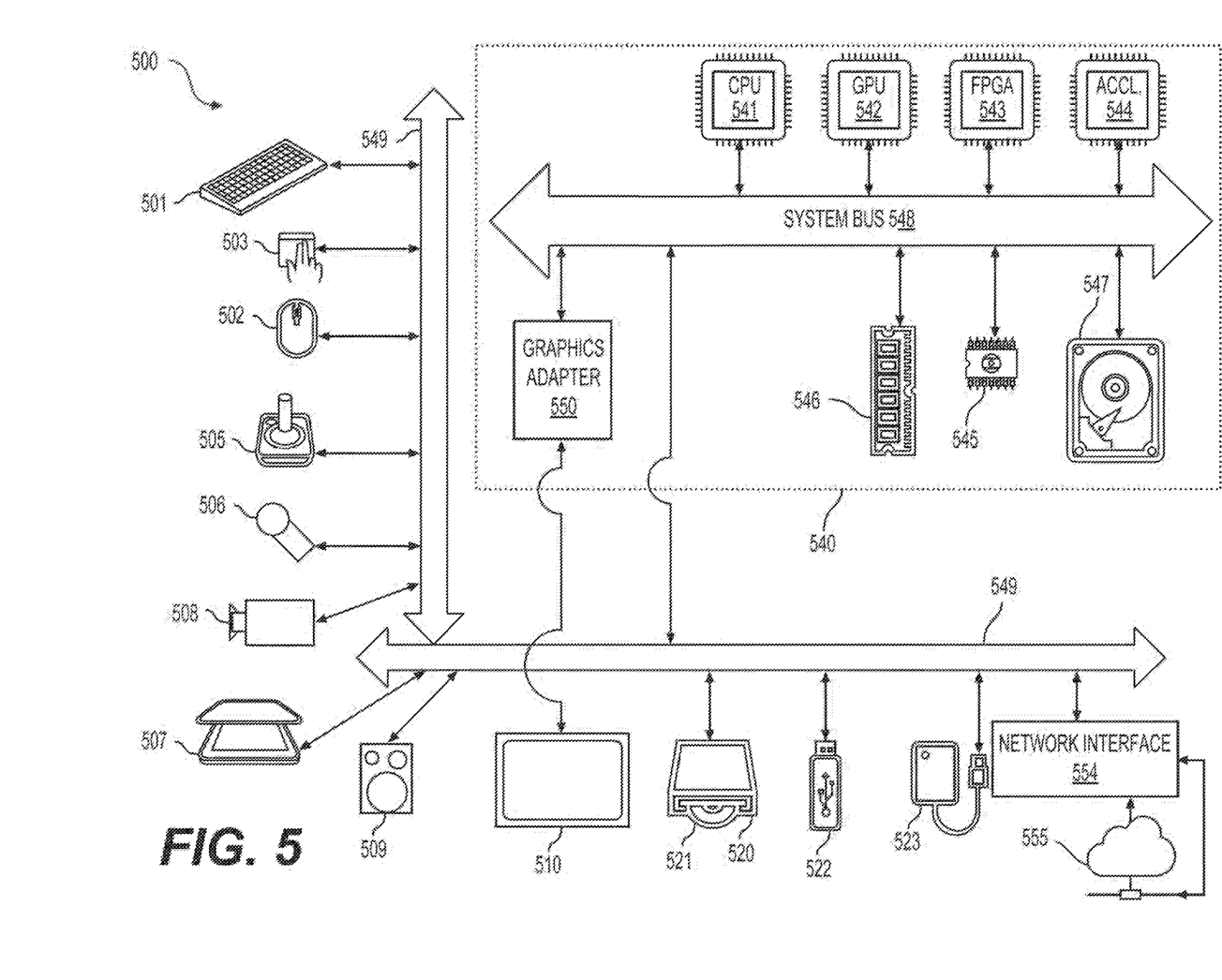
FIG. 5 shows a schematic illustration of a computer system according to an embodiment of the disclosure.

FIG. 5 shows a computer system (500) suitable for implementing certain embodiments of the disclosed subject matter. The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as; voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include an interface (554) to one or more communication networks (555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adaptors that attached to certain general purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described herein.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators (544) for certain tasks, graphics adapters (550), and so forth. These devices, along with Read-only memory (ROM) (545), Random-access memory (546), internal mass storage such as internal non-user accessible hard drives, SSDs, and the like (547), may be connected through a system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). In an example, the screen (510) can be connected to the graphics adapter (550). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can be also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (500), and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described above, including defining data structures stored in RAM (546) and modifying such data structures according to the processes defined by the software. In addition or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of network-based media processing (NBMP), comprising:
   receiving a function description of a media processing function from a function repository at a workflow manager in an NBMP system, the function description including a configuration descriptor providing configuration information of parameters for the media processing function, the parameters having logical relationships represented by a parameter representation graph constructed according to a set of rules that include:
   (a) the parameter representation graph includes nodes and edges each connecting two nodes and representing a logical relationship between two respective nodes, the nodes including parameter nodes and value nodes,
   (b) any two nodes are connected to each other with at most one edge,
   (c) a parameter is represented by a parameter node in the parameter representation graph,
   (d) when presence of a first parameter's first value is required as a condition for setting a second parameter, the first parameter's first value is represented by a value node in the parameter representation graph, and
   when absence of the first parameter's first value is required as the condition for setting the second parameter,
     the first parameter's first value is represented by the value node in the parameter representation graph, and
     an edge from the value node of the first parameter's first value to a parameter node of the second parameter indicates that the second parameter is not allowed when the first parameter is set to the first parameter's first value,
   (e) a parameter node is connected from no other node, or one or more value nodes, and
   (f) one edge is connected to any value node and from a single parameter node;
   instantiating the media processing function as a media processing task that is part of a workflow; and
   configuring the media processing task based on the configuration information of the parameters in the configuration descriptor.

2. The method of claim 1, wherein the parameter representation graph corresponding to the configuration descriptor complies with the rules that further include:
   (g) the edges in the parameter representation graph are categorized into three types defined as follows:
     (i) P2V: a first connection from a parameter node to a value node indicating that the parameter of the parameter node connected to the first connection takes a subset or a range of allowed values represented by the value node connected to the first connection,
     (ii) V2P: a second connection from a value node to a parameter node indicating a dependency of the parameter represented by the parameter node connected to the second connection to a parent parameter taking a value represented by the value node connected to the second connection, and
     (iii) V0P: a third connection from a value node to a parameter node indicating that the parameter represented by the parameter node connected to the third connection is not allowed if a parent parameter is set to a value represented by the value node connected to the third connection; and (h) any edge connected to a parameter node is of the type of V2P or V0P.

3. The method of claim 2, wherein each of the parameters has a data type indicated in the configuration descriptor.

4. The method of claim 2, wherein each of the parameters has a value that is a set of values or a range of values.

5. The method of claim 2, wherein the edges of one of the parameter nodes in the parameter representation graph are indicated by two separate lists in the configuration descriptor, the two separate lists corresponding to the V2P type and the V0P type, respectively.

6. The method of claim 5, wherein identifiers (IDs) of the value nodes connected to the respective edges indicated by the two separate lists in the configuration descriptor are included in the two separate lists in the configuration descriptor to indicate the respective edges of the one of the parameter nodes.

7. The method of claim 2, wherein one of the parameter nodes and one of the value nodes in the parameter representation graph each use a list of parent node IDs to indicate the edges connected to the one of the parameter nodes and the one of the value nodes.

8. The method of claim 2, wherein a set of values of one of the value nodes in the parameter representation graph is defined using a start value, an end value and an increment value in the configuration descriptor.

9. An apparatus of network-based media processing (NBMP), comprising circuitry configured to:
receive a function description of a media processing function from a function repository at a workflow manager in an NBMP system, the function description including a configuration descriptor providing configuration information of parameters for the media processing function, the parameters having logical relationships represented by a parameter representation graph constructed according to a set of rules that include:
(a) the parameter representation graph includes nodes and edges each connecting two nodes and representing a logical relationship between two respective nodes, the nodes including parameter nodes and value nodes,
(b) any two nodes are connected to each other with at most one edge,
(c) a parameter is represented by a parameter node in the parameter representation graph,
(d) when presence of a first parameter's first value is required as a condition for setting a second parameter, the first parameter's first value is represented by a value node in the parameter representation graph, and
when absence of the first parameter's first value is required as the condition for setting the second parameter,
the first parameter's first value is represented by the value node in the parameter representation graph, and
an edge from the value node of the first parameter's first value to a parameter node of the second parameter indicates that the second parameter is not allowed when the first parameter is set to the first parameter's first value,
(e) a parameter node is connected from no other node, or one or more value nodes, and
(f) one edge is connected to any value node and from a single parameter node;
instantiate the media processing function as a media processing task that is part of a workflow; and
configure the media processing task based on the configuration information of the parameters in the configuration descriptor.

10. The apparatus of claim 9, wherein the parameter representation graph corresponding to the configuration descriptor complies with the rules that further include:
(g) the edges in the parameter representation graph are categorized into three types defined as follows:
(i) P2V: a first connection from a parameter node to a value node indicating that the parameter of the parameter node connected to the first connection takes a subset or a range of allowed values represented by the value node connected to the first connection,
(ii) V2P: a second connection from a value node to a parameter node indicating a dependency of the parameter represented by the parameter node connected to the second connection to a parent parameter taking a value represented by the value node connected to the second connection, and
(iii) V0P: a third connection from a value node to a parameter node indicating that the parameter represented by the parameter node connected to the third connection is not allowed if a parent parameter is set to a value represented by the value node connected to the third connection; and
(h) any edge connected to a parameter node is of the type of V2P or V0P.

11. The apparatus of claim 10, wherein each of the parameters has a data type indicated in the configuration descriptor.

12. The apparatus of claim 10, wherein each of the parameters has a value that is a set of values or a range of values.

13. The apparatus of claim 10, wherein the edges of one of the parameter nodes in the parameter representation graph are indicated by two separate lists in the configuration descriptor, the two separate lists corresponding to the V2P type and the V0P type, respectively.

14. The apparatus of claim 13, wherein identifiers (IDs) of the value nodes connected to the respective edges indicated by the two separate lists in the configuration descriptor are included in the two separate lists in the configuration descriptor to indicate the respective edges of the one of the parameter nodes.

15. The apparatus of claim 10, wherein one of the parameter nodes and one of the value nodes in the parameter representation graph each use a list of parent node IDs to indicate the edges connected to the one of the parameter nodes and the one of the value nodes.

16. The apparatus of claim 10, wherein a set of values of one of the value nodes in the parameter representation graph is defined using a start value, an end value and an increment value in the configuration descriptor.

17. A non-transitory computer-readable medium storing instructions that, when executed by a processor, cause the processor to perform a method of network-based media processing (NBMP), the method comprising:
receiving a function description of a media processing function from a function repository at a workflow manager in an NBMP system, the function description including a configuration descriptor providing configuration information of parameters for the media processing function, the parameters having logical relationships represented by a parameter representation graph constructed according to a set of rules that include:

(a) the parameter representation graph includes nodes and edges each connecting two nodes and representing a logical relationship between two respective nodes, the nodes including parameter nodes and value nodes, (b) any two nodes are connected to each other with at most one edge, (c) a parameter is represented by a parameter node in the parameter representation graph, (d) when presence of a first parameter's first value is required as a condition for setting a second parameter, the first parameter's first value is represented by a value node in the parameter representation graph, and when absence of the first parameter's first value is required as the condition for setting the second parameter, the first parameter's first value is represented by the value node in the parameter representation graph, and an edge from the value node of the first parameter's first value to a parameter node of the second parameter indicates that the second parameter is not allowed when the first parameter is set to the first parameter's first value, (e) a parameter node is connected from no other node, or one or more value nodes, and (f) one edge is connected to any value node and from a single parameter node;

instantiating the media processing function as a media processing task that is part of a workflow; and configuring the media processing task based on the configuration information of the parameters in the configuration descriptor.

18. The non-transitory computer-readable medium of claim 17, wherein the parameter representation graph corresponding to the configuration descriptor complies with the rules that further include:

(g) the edges in the parameter representation graph are categorized into three types defined as follows:

(i) P2V: a first connection from a parameter node to a value node indicating that the parameter of the parameter node connected to the first connection takes a subset or a range of allowed values represented by the value node connected to the first connection, (ii) V2P: a second connection from a value node to a parameter node indicating a dependency of the parameter represented by the parameter node connected to the second connection to a parent parameter taking a value represented by the value node connected to the second connection, and (iii) V0P: a third connection from a value node to a parameter node indicating that the parameter represented by the parameter node connected to the third connection is not allowed if a parent parameter is set to a value represented by the value node connected to the third connection; and (h) any edge connected to a parameter node is of the type of V2P or V0P.

19. The non-transitory computer-readable medium of claim 18, wherein each of the parameters has a data type indicated in the configuration descriptor.

20. The non-transitory computer-readable medium of claim 18, wherein each of the parameters has a value that is a set of values or a range of values.

* * * * *